(12) United States Patent
He et al.

(10) Patent No.: US 11,767,422 B2
(45) Date of Patent: Sep. 26, 2023

(54) RABS/PBT/ASG COMPOSITE MATERIAL AND PREPARATION METHOD THEREOF

(71) Applicant: South China University of Technology, Guangzhou (CN)

(72) Inventors: Hezhi He, Guangzhou (CN); Zhiming Zhan, Guangzhou (CN); Yanhong Feng, Guangzhou (CN); Xiaochun Yin, Guangzhou (CN); Jinping Qu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 301 days.

(21) Appl. No.: 17/311,008

(22) PCT Filed: Oct. 18, 2019

(86) PCT No.: PCT/CN2019/112049
§ 371 (c)(1),
(2) Date: Jun. 4, 2021

(87) PCT Pub. No.: WO2020/114106
PCT Pub. Date: Jun. 11, 2020

(65) Prior Publication Data
US 2022/0017742 A1  Jan. 20, 2022

(30) Foreign Application Priority Data
Dec. 6, 2018 (CN) .......................... 201811485833.6

(51) Int. Cl.
C08L 55/02 (2006.01)
C08J 3/00 (2006.01)
(52) U.S. Cl.
CPC ............... *C08L 55/02* (2013.01); *C08J 3/005* (2013.01); *C08L 2205/03* (2013.01); *C08L 2207/20* (2013.01)
(58) Field of Classification Search
CPC ........ C08L 55/02; C08L 25/12; C08J 2355/02
See application file for complete search history.

(56) References Cited

U.S. PATENT DOCUMENTS 4,421,892 A  12/1983  Kasahara et al.

FOREIGN PATENT DOCUMENTS

| CN | 101851430 A | 10/2010 |
| CN | 103224695 A | 7/2013 |
| CN | 104629315 A | 5/2015 |
| CN | 106117954 | * 11/2016 |
| CN | 106117954 A | 11/2016 |
| CN | 106479108 A | 3/2017 |
| CN | 109721940 A | 5/2019 |

OTHER PUBLICATIONS

Yang et al., electronic translation of CN 106117954, Nov. 2016.*

* cited by examiner

*Primary Examiner* — Jeffrey C Mullis
(74) *Attorney, Agent, or Firm* — THE WEBB LAW FIRM

(57) ABSTRACT

A rABS/PBT/ASG composite material and a preparation method thereof utilize the characteristics of rABS with carboxyl and hydroxyl groups, wherein rABS are pre-blended with ASG to increase the viscosity, so that the epoxy groups on the ASG molecules react with the hydroxyl groups and the carboxyl groups on the rABS, and the acrylonitrile-styrene segments in ASG and rABS are thermodynamically miscible, followed by reacting and blending with PBT to prepare the rABS/PBT/ASG composite material. ASG acts as a chain extender and solubilizer in the mixture. The mixture prepared in this way have good compatibility, and the tensile strength, impact strength and elongation at break of the composite material are comprehensively improved. The composite material obtained has the advantages of both ABS and PBT materials, which has broad application prospects in the field of ABS plastic recycling.

10 Claims, 2 Drawing Sheets

RABS/PBT/ASG COMPOSITE MATERIAL AND PREPARATION METHOD THEREOF

CROSS-REFERENCE TO RELATED APPLICATIONS

This application is the United States national phase of International Application No. PCT/CN2019/112049 filed Oct. 18, 2019, and claims priority to Chinese Patent Application No. 201811485833.6 filed Dec. 6, 2018.

BACKGROUND OF THE INVENTION

Field of the Invention

The invention belongs to the field of recycling and reuse of polymer materials, and specifically relates to a high-performance, low-cost rABS/PBT/ASG composite material and a preparation method thereof.

Description of Related Art

Polyacrylonitrile-butadiene-styrene (ABS) copolymer is widely used in automobiles, electrical and electronic equipment due to its good processability, high impact strength and high-gloss surface, which is an engineering plastic with a high market share. At present, more than 30% of ABS in the world is used in automobiles, and it is an indispensable material in auto parts. In addition, more than 30% of ABS in the world is used in home appliances, which is in a dominant position. Due to the huge demand and consumption of ABS plastics, a large amount of waste plastics are produced every year, which are directly disposed of by landfill and incineration, leading to a great waste of resources and serious pollution to the environment. However, direct recycling of waste ABS is difficult to meet the product quality requirements due to its reduced mechanical properties. Therefore, how to effectively recycle waste ABS is an urgent problem to be solved.

Acrylonitrile-styrene-glycidyl methacrylate (ASG) is a terpolymer that can be prepared by suspension polymerization. Styrene (St) is prone to homopolymerization due to the conjugation effect, while acrylonitrile (AN) is difficult to homopolymerize under normal conditions due to its polarity. When the above two monomers are mixed according to a certain ratio, copolymerization may be easily achieved under the presence of an initiator, and the copolymerization product has a regular alternating structure. Cyano group is an electron-withdrawing group, which reduces the electron cloud density on the carbon-carbon double bond and allows it to have a partial positive charge, while styrene is a large conjugated system, so that under the induction of positively charged acrylonitrile, the charge of the benzene ring moves to the double bond, which increases the electron cloud density on the carbon-carbon double bond and allows it to become partly negatively charged. These two monomers with opposite charges constitute a electron acceptor-electron donor system. Under the classical action, they readily form a charge transfer coordination compound. This coordination compound can be regarded as a macromonomer. Under the presence of an initiator, it undergoes free radical polymerization to form an alternating copolymerization structure; glycidyl methacrylate ester (GMA) is difficult to homopolymerize under normal conditions due to steric hindrance, and it is also easy to form alternating copolymers when glycidyl methacrylate and styrene are copolymerized. Therefore, the three monomers tend to form the following structures in the case of suspension polymerization:

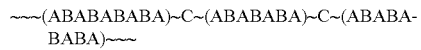

wherein, A, B, and C are styrene, acrylonitrile, and glycidyl methacrylate, respectively. This terpolymer is randomly distributed with different numbers of epoxy groups, which can act as a compatibilizer or even a chain extender in the blending modification of polyester polymers.

Polybutylene terephthalate (PBT), as an engineering plastic, is a semi-crystalline thermoplastic with good rigidity, high strength, and excellent chemical resistance. However, PBT is brittle and extremely sensitive to notch defects. Therefore, the existing research has combined ABS and PBT to make up for the shortcomings of the two materials and obtain an ABS/PBT composite material with the advantages of both ABS and PBT. However, there are few reports on the blending modification of recycled ABS (rABS) and PBT. Therefore, how to effectively use waste ABS and prepare better performance rABS/PBT composites has practical significance.

SUMMARY OF THE INVENTION

A primary purpose of the present invention is to provide a method for preparing a rABS/PBT/ASG composite material.

Another purpose of the present invention is to provide a rABS/PBT/ASG composite material obtained by the above preparation method.

In order to achieve the above purposes, the technical solutions of the present invention are as follows:

A method for preparing a rABS/PBT/ASG composite material comprises the following steps: melt blending rABS and ASG (acrylonitrile-styrene-glycidyl methacrylate), adding PBT (polybutylene terephthalate) for melt blending, successively cooling, air-drying, crushing and drying the resulted mixture to obtain the rABS/PBT/ASG composite material.

Preferably, the rABS is particles obtained by screening, crushing by a crusher, washing, drying, extruding, pelletizing and drying of waste ABS;

Preferably, the mass ratio of styrene (st), acrylonitrile (AN) and glycidyl methacrylate (GMA) in the ASG is St/AN/GMA=65/25/6.

Preferably, the ASG is prepared by the following method: measuring 200 mL of deionized water in a beaker, adding 1 g of polyvinyl alcohol, stirring and pouring into a 1 L three-necked flask; successively measuring 100 mL of deionized water to wash the beaker for 3 times, pouring the washed solution into the three-necked flask, heating and stirring at a heating temperature of 65° C., wherein the stirring speed is configured to allow the liquid to swirl but not splashing; after the temperature is stable for 30 minutes, adding 65 g of refined styrene, 25 g of acrylonitrile, 6 g of glycidyl methacrylate, and 1 g of dibenzoyl peroxide in a three-necked flask, heating and stirring for 7~8 h, raising the temperature to 75° C. to harden for 1~2 h, conducting suction filtration and washing the product with hot water for 3~5 times to remove monomers, and drying the obtained ASG beads at 45° C. for 12 h.

Preferably, the PBT is commonly used commercially available extrusion-grade particles.

Preferably, the melt blending uses a Brabender internal mixer.

The model of the Brabender internal mixer is DDRV501, the manufacturer of which is Brabender Instruments, Inc., USA.

Preferably, the mass parts of rABS and PBT in the mixture are 70 parts of rABS and 30 parts of PBT.

Preferably, the weight of ASG in the mixture is 2%-8% of the total weight of rABS and PBT.

Preferably, the time for melt blending rABS and ASG is 4-6 min.

Preferably, the total blending time for melt blending the rABS is 10-12 min.

Preferably, the temperature of the melt blending is 220-250° C.

Preferably, the rotor speed of the melt blending is 40-60 rpm.

A rABS/PBT/ASG composite material obtained by the above preparation method is further provided by the present invention.

Compared with the prior art, the present invention has the following advantages and beneficial effects:

The main reason for the loss of toughness of ABS to become rABS is that it will oxidize under the action of heat and force during use and generate carboxyl, hydroxyl and carbonyl groups. The present invention makes use of the characteristics of rABS with carboxyl group and hydroxyl group to blend rABS and ASG in advance to increase the viscosity, followed by reacting and blending with PBT to prepare the rABS/PBT/ASG composite material. In this process, the epoxy groups on the ASG molecules can react with the carboxyl and hydroxyl groups on the rABS. Similarly, a similar reaction also occurs during the blending of ASG and PBT. Because the acrylonitrile-styrene segment in ASG may be thermodynamically miscible with rABS, ASG acts as a chain extender and solubilizer in the mixture. This method effectively increases the molecular weight of rABS, improves the mechanical properties of the composite material, avoids the competitive reaction of rABS, PBT and ASG happened in direct blending, reduces the possibility of PBT chain extension and viscosity increase, thereby obtaining a blending system with a disperse phase having a smaller particle size and with more evenly distributed particles. The mixture prepared in this way have good compatibility, and the tensile strength, impact strength and elongation at break of the composite material are comprehensively improved. Compared with the multi-component system where elastomer and compatibilizer are added at the same time, cost is reduced and the components are simplified. The obtained composite material has the advantages of both ABS and PBT materials, and has broad application prospects in the field of ABS plastic recycling, which is of great significance to the construction of an environment-friendly and resource-saving society.

DETAILED DESCRIPTION

Figure 1:
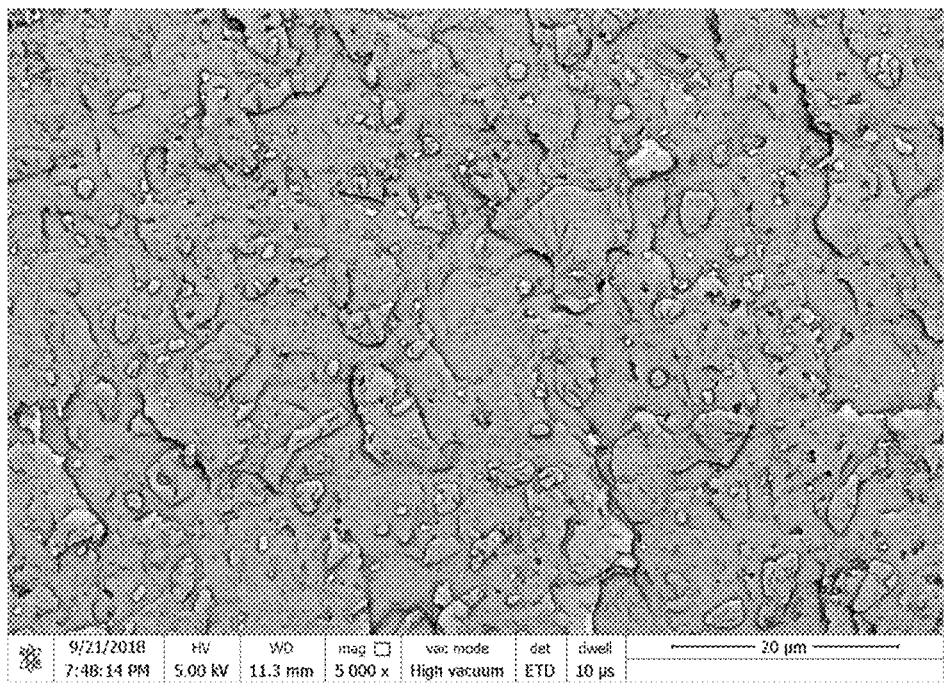
FIG. 1 is an SEM image of the rABS/PBT/ASG composite material prepared in Example 1.

The present invention will be further described in detail below in conjunction with the examples and drawings, but the implementation of the present invention is not limited to this. For parameters that are not specifically described, reference can be made to conventional techniques.

The rABS used in the following examples was provided by Guangzhou Kingfa Technology Co., Ltd.; the PBT used was purchased from BASF, Germany, and the model is B6550;

analytical reagent (AR) acrylonitrile and styrene were provided by Guangzhou Wenrui Scientific Instrument Co., Ltd.; glycidyl methacrylate was purchased from Aladdin Reagent (Shanghai) Co., Ltd., with a concentration of 97%; polyvinyl alcohol was purchased from Aladdin Reagent (Shanghai) Co., Ltd., with a concentration of 99.8%; analytical reagent (AR) dibenzoyl peroxide was purchased from Aladdin Reagent (Shanghai) Co., Ltd.

Example 1

This example provides a rABS/PBT/ASG006 composite material and a preparation method thereof.

Weigh 42 g of rABS, 18 g of PBT and 1.2 g of ASG006, first blend rABS and ASG006 in a Brabender internal mixer for 4 minutes, and then add PBT to continue melting and blending for 6 minutes, where all the three-stage melting temperatures of the Brabender internal mixer were 240° C., and the screw speed was 40 rpm. After internal mixing and molding, cooling, air drying, crushing, and drying, the rABS/PBT/ASG006 composite material was obtained.

Example 2

As a comparative example of Example 1, this example provides a rABS/PBT/ASG006 composite material prepared by blending rABS, PBT and ASG006 simultaneously.

Weigh 42 g of rABS, 18 g of PBT, and 1.2 g of ASG006. Mix the above components in a Brabender internal mixer for 10 minutes, wherein all the three-stage melting temperatures of the Brabender internal mixer were set to 240° C., and the screw speed was 40 rpm. After internal mixing and molding, cooling, air drying, crushing, and drying, the rABS/PBT/ASG0006 composite material was obtained.

Example 3

As a comparative example of Example 1, this example provides a rABS/PBT/ASG006 composite material prepared by mixing ASG006 with PBT followed by mixing with rABS.

Weigh 42 g of rABS, 18 g of PBT and 1.2 g of ASG006, first mix PBT and ASG006 in a Brabender internal mixer for 4 minutes, then mix with rABS for 6 minutes, wherein all the Brabender three-stage melting temperatures were set to 240° C., and the screw speed was 40 rpm. After internal mixing and molding, cooling, air drying, crushing, and drying, the rABS/PBT/ASG0006 composite material was obtained.

Example 4

This example serves as a comparative example of Example 1 and provides a rABS/PBT/ASG composite material using ASG002 as a chain extender and a solubilizer.

Weigh 42 g of rABS, 18 g of PBT, and 1.2 g of ASG002 which was prepared by suspension polymerization, wherein the ratio of three monomers was styrene:acrylonitrile:glycidyl methacrylate=65/25/2. First mix rABS and ASG002 in a Brabender internal mixer for 4 minutes, then mix with PBT for 6 minutes, wherein all the three-stage melting temperatures were 240° C., and the screw speed is 40 rpm. After internal mixing and molding, cooling, air drying, crushing, and drying, the rABS/PBT/ASG0002 composite material was obtained.

Example 5

This example serves as a comparative example of Example 1 and provides a rABS/PBT/ASG composite material using ASG004 as a chain extender and a solubilizer.

Weigh 42 g of rABS, 18 g of PBT, and 1.2 g of ASG004 which was prepared by suspension polymerization, wherein the ratio of three monomers was styrene:acrylonitrile:glycidyl methacrylate=65/25/4. First mix rABS and ASG004 in a Brabender internal mixer for 4 minutes, then mix with PBT for 6 minutes, wherein all the three-stage melting temperatures were 240° C., and the screw speed was 40 rpm. After internal mixing and molding, cooling, air drying, crushing, and drying, the rABS/PBT/ASG0004 composite material was obtained.

Example 6

This example serves as a comparative example of Example 1 and provides a rABS/PBT/ASG composite material using ASG008 as a chain extender and a solubilizer.

Weigh 42 g of rABS, 18 g of PBT, and 1.2 g of ASG008 which was prepared by suspension polymerization, wherein the ratio of three monomers was styrene:acrylonitrile:glycidyl methacrylate=65/25/8. First mix rABS and ASG008 in a Brabender internal mixer for 4 minutes, then mix with PBT for 6 minutes, wherein all the three-stage melting temperatures were 240° C., and the screw speed was 40 rpm. After internal mixing and molding, cooling, air drying, crushing, and drying, the rABS/PBT/ASG0008 composite material was obtained.

Refer to GB/T 1040-2006, the tensile strength and elongation at break of the composite materials in Examples 1-6 were tested, and refer to GB/T 1043-2008, the Izod notched impact strength of the composite materials in Example 1-6 was tested, the results being shown in Table 1.

From Example 1, Example 2, and Example 3, it can be seen that compared with the method of mixing rABS, ASG and PBT simultaneously (Example 2) and the method of mixing ASG with PBT first and then with rABS (Example 3), the method of first mixing rABS with ASG and then with PBT (Example 1) can significantly improve the tensile strength, elongation at break and Izod notched impact strength of the material.

From Example 1, Example 4, Example 5, and Example 6, it can be seen that different GMA contents in ASG may affect the comprehensive effect of chain extension and reaction compatibility. ASG006 can optimally match the process, and the resulting rABS/PBT/ASG composite material has the best comprehensive mechanical properties.

Figure 2:
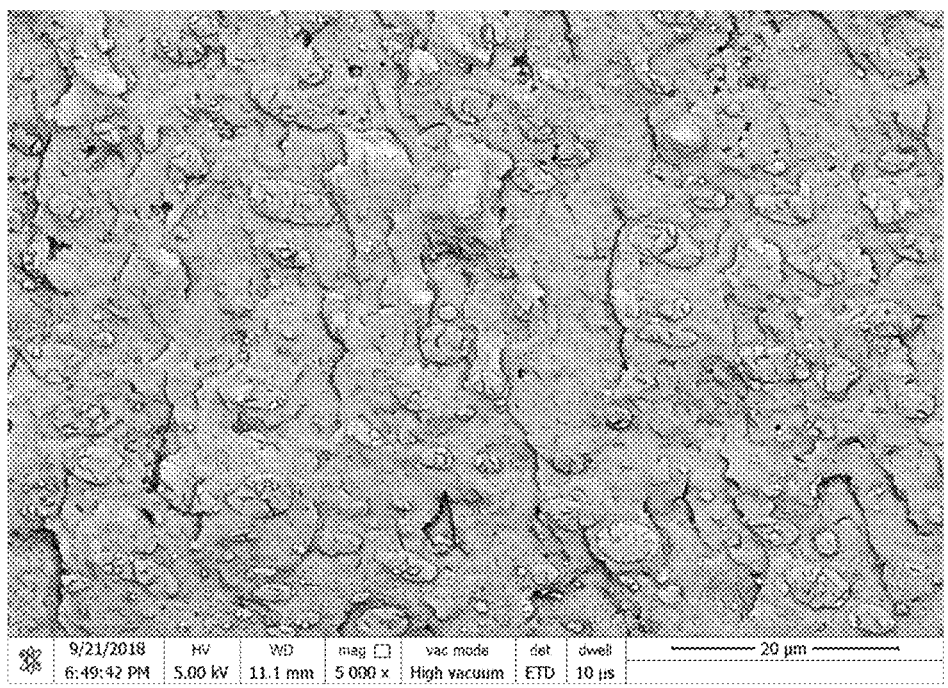
FIG. 2 is an SEM image of the rABS/PBT/ASG composite material prepared in Example 2.
Figure 3:
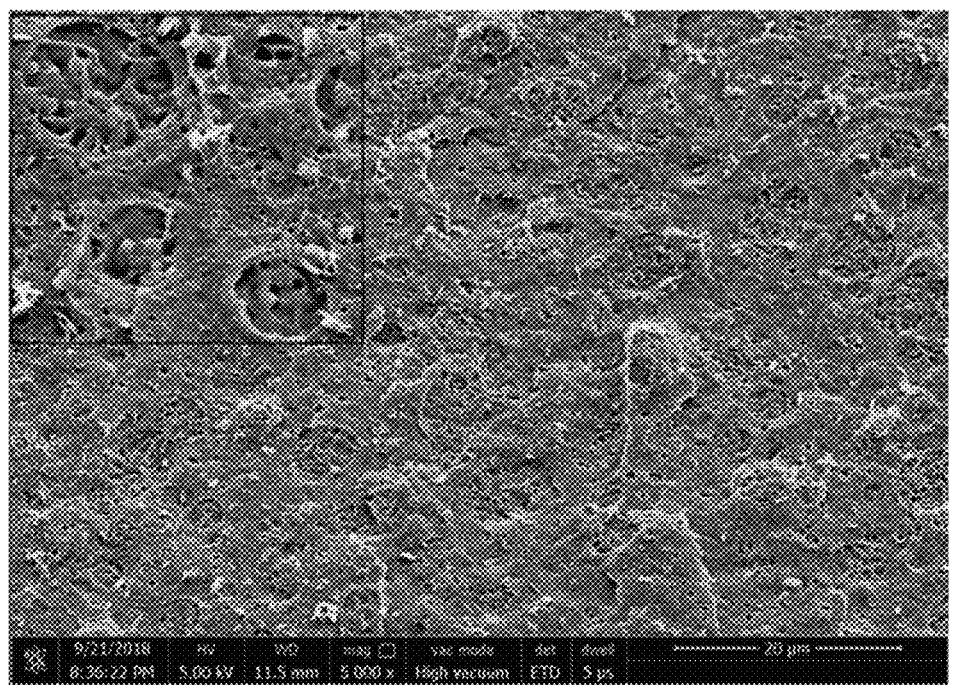
FIG. 3 is an SEM image of the rABS/PBT/ASG composite material prepared in Example 3.

The microscopic morphology of the rABS/PBT/ASG composite materials prepared in Examples 1-3 (after being etched) was observed with a scanning electron microscope. The results are shown in FIGS. 1-3, wherein the upper left corner of FIG. 3 shows the microscopic morphology of the etched PBT phase enlarged by 4 times. It can be seen that compared with the rABS/PBT/ASG composite material prepared by either the one-step method or melt blending with PBT at first, the rABS/PBT/ASG06 composite material prepared by melt blending rABS and ASG06 at first has a better interface, smaller particle size and more uniform distribution, where the two phases can be mixed better under the same compatibilizers.

TABLE 1

Mechanical properties of the composite materials of Examples 1-6

| | Tensile strength (MPa) | Elongation at break (%) | Izod notched impact strength (KJ/m$^2$) |
|---|---|---|---|
| Standard | GB/T 1040-2006 | | GB/T 1043-2008 |
| Example 1 | 34.4 | 14.81 | 3.019 |
| Example 2 | 33.19 | 12.46 | 2.026 |
| Example 3 | 29.88 | 6.53 | 1.770 |
| Example 4 | 33.18 | 9.74 | 2.124 |
| Example 5 | 34.06 | 9.58 | 2.632 |
| Example 6 | 33.69 | 10.67 | 2.867 |

Example 7

This Example provides a rABS/PBT/ASG006 composite material and a preparation method thereof.

A rABS/PBT/ASG006 composite material is provided, where ASG006 accounts for 5% of the total mass of rABS and PBT.

Preparation method: weigh 42 g of rABS, 18 g of PBT and 3.0 g of ASG006, mix rABS and ASG006 in a Brabender internal mixer for 4 minutes, then mix with PBT for 6 minutes, wherein all the Brabender three-stage melting temperatures were set to 240° C., and the screw speed was 40 rpm. After internal mixing and molding, cooling, air drying, crushing, and drying, the rABS/PBT/ASG0006 composite material was obtained.

Example 8

This Example provides a rABS/PBT/ASG006 composite material and a preparation method thereof.

A rABS/PBT/ASG006 composite material is provided, where ASG006 accounts for 8% of the total mass of rABS and PBT.

Preparation method: weigh 42 g of rABS, 18 g of PBT and 4.8 g of ASG006, mix rABS and ASG006 in a Brabender internal mixer for 4 minutes, then mix with PBT for 6 minutes, wherein all the Brabender three-stage melting temperatures were set to 240° C., and the screw speed was 40 rpm. After internal mixing and molding, cooling, air drying, crushing, and drying, the rABS/PBT/ASG0006 composite material was obtained.

The above-mentioned embodiments are preferred embodiments of the present invention, but the embodiments of the present invention are not limited by the above-mentioned embodiments, and any other changes, modifications, substitutions, combinations, and simplifications made without departing from the spirit and principle of the present invention all should be equivalent replacement methods, and they are all included in the protection scope of the present invention.

The invention claimed is:

1. A method for preparing a rABS/PBT/ASG composite material, characterized in that it comprises the following steps: melt blending rABS and ASG, then adding PBT for melt blending, successively cooling, air-drying, crushing and drying the resulted mixture to obtain the rABS/PBT/ASG composite material.

2. The method for preparing the rABS/PBT/ASG composite material according to claim 1, wherein:

the rABS is particles obtained by screening, crushing by a crusher, washing, drying, extruding, pelletizing and drying of waste ABS;

the PBT is commonly used commercially available extrusion-grade particles.

3. The method for preparing the rABS/PBT/ASG composite material according to claim 1, wherein: the mass ratio of styrene, acrylonitrile and glycidyl methacrylate in the ASG is St/AN/GMA=65/25/6.

4. The method for preparing the rABS/PBT/ASG composite material according to claim 1, wherein: the mass parts of rABS and PBT in the mixture are 70 parts of rABS and 30 parts of PBT.

5. The method for preparing the rABS/PBT/ASG composite material according to claim 1, wherein: the weight of ASG in the mixture is 2%-8% of the total weight of rABS and PBT.

6. The method for preparing the rABS/PBT/ASG composite material according to claim 1, wherein:

the time for melt blending rABS and ASG is 4-6 min;
the total blending time for melt blending the rABS is 10-12 min.

7. The method for preparing the rABS/PBT/ASG composite material according to claim 1, wherein: the temperature of the melt blending is 220-250° C.

8. The method for preparing the rABS/PBT/ASG composite material according to claim 1, wherein: the rotor speed of the melt blending is 40-60 rpm.

9. The method for preparing the rABS/PBT/ASG composite material according to claim 3, wherein: the ASG is prepared by the following method: measuring 200 mL of deionized water in a beaker, adding 1 g of polyvinyl alcohol, stirring and pouring into a 1 L three-necked flask; successively measuring 100 ml of deionized water to wash the beaker for 3 times, pouring the washed solution into the three-necked flask, heating and stirring at a heating temperature of 65° C., wherein the stirring speed is configured to allow the liquid to swirl but not splashing; after the temperature is stable for 30 minutes, adding 65 g of refined styrene, 25 g of acrylonitrile, 6 g of glycidyl methacrylate, and 1 g of dibenzoyl peroxide in a three-necked flask, heating and stirring for 7~8 h, raising the temperature to 75° C. to harden for 1~2 h, conducting suction filtration and washing the product with hot water for 3~5 times to remove monomers, and drying the obtained ASG beads at 45° C. for 12 h.

10. A rABS/PBT/ASG composite material, obtained by the method of claim 1.

* * * * *